United States Patent
Wan et al.

(10) Patent No.: US 7,654,685 B2
(45) Date of Patent: Feb. 2, 2010

(54) VARIABLE-WAVELENGTH ILLUMINATION SYSTEM FOR INTERFEROMETRY

(75) Inventors: Der-Shen Wan, Tucson, AZ (US); Colin Farrell, Tucson, AZ (US); Erik L. Novak, Tucson, AZ (US)

(73) Assignee: Veeco Instruments, Inc., Tucson, AZ (US)

( * ) Notice: Subject to any disclaimer, the term of this patent is extended or adjusted under 35 U.S.C. 154(b) by 500 days.

(21) Appl. No.: 11/714,343

(22) Filed: Mar. 6, 2007

(65) Prior Publication Data

US 2008/0218999 A1    Sep. 11, 2008

(51) Int. Cl.
*F21V 9/00*    (2006.01)
*G01B 9/02*    (2006.01)
*G01J 3/45*    (2006.01)

(52) U.S. Cl. .................. 362/231; 356/450; 356/451
(58) Field of Classification Search .......... 356/450, 356/451, 484; 362/231
See application file for complete search history.

(56) References Cited

U.S. PATENT DOCUMENTS

| | | | | |
|---|---|---|---|---|
| 4,071,809 A * | 1/1978 | Weiss et al. | ................. | 315/312 |
| 6,623,122 B1 * | 9/2003 | Yamazaki et al. | ............ | 353/30 |
| 7,401,925 B2 * | 7/2008 | Lu | ............................... | 353/31 |
| 2005/0135095 A1 * | 6/2005 | Geissler | ..................... | 362/231 |
| 2006/0018119 A1 * | 1/2006 | Sugikawa et al. | ........... | 362/231 |

* cited by examiner

*Primary Examiner*—Patrick J Connolly
(74) *Attorney, Agent, or Firm*—Antonio R. Durando

(57) ABSTRACT

An illumination system for an interferometer combines a white-light source and a green source with a reflective green dichroic filter. When the green source alone is energized for PSI measurements, the output of the illumination system is green only. When a white-light output is desired for VSI measurements, both sources are energized and the intensity of the green light is judiciously calibrated to match the spectral band filtered out by the dichroic mirror. Therefore, the system can switch between green and white light simply by changing the selection of energized sources, without any mechanical switching and attendant delays and vibrations. Multiple narrowband sources may be combined with white light in a similar manner.

20 Claims, 10 Drawing Sheets

VARIABLE-WAVELENGTH ILLUMINATION SYSTEM FOR INTERFEROMETRY

BACKGROUND OF THE INVENTION

1. Field of the Invention

This invention relates in general to interferometric techniques for surface characterization. In particular, it relates to a new method for providing illumination at different wavelengths for different interferometric applications.

2. Description of the Related Art

Interferometric profilometry enables the performance of non-contact measurement of a surface with high resolution and high measurement speed. Several widely accepted techniques are available for acquiring light intensity data from correlograms generated by interfering light beams reflected from a test object and a reference surface and for calculating the surface topography of the object using a variety of well known analytical tools.

Most notably, phase-shifting interferometry (PSI) is based on changing the phase difference between two coherent interfering beams using a narrowband light, or at a single wavelength $\lambda$, to measure fairly smooth and continuous surfaces. Large-step, rough, or steep-surface measurements, on the other hand, have been traditionally carried out with white-light (or broadband light) vertical-scanning interferometry (VSI). Combinations and variations of PSI and VSI have been introduced in the art over the years to improve data acquisition and the quality of the measurements. See, for example, the so-called enhanced vertical scanning interferometry (EVSI) and the high-definition vertical-scan interferometry (HDVSI) processed described in copending U.S. Ser. No. 11/473,447.

Figure 1:
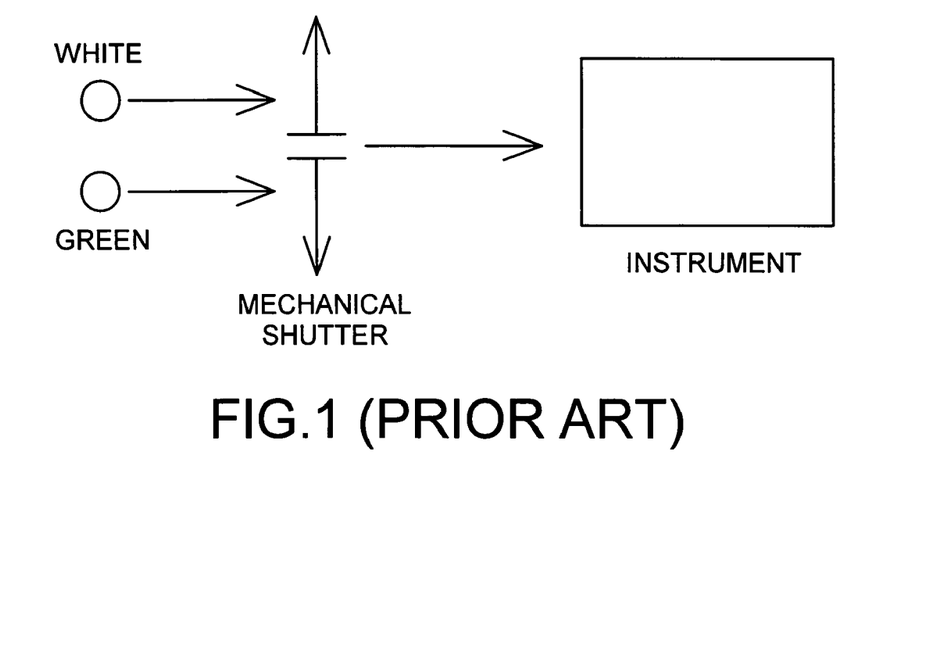
FIG. 1 is a schematic illustration of a prior-art illumination system including a green light source suitable for PSI, a white-light source for VSI, and a mechanical shutter in front of the instrument's optics to allow switching between the two.

Because different interferometric approaches used for different test surfaces require illumination at different wavelengths for best results, interferometers have incorporated illumination systems that permit switching wavelengths to suit the need. As the availability of reliable light emitting diodes of particular wavelengths has improved, the illumination systems have incorporated various combinations of diodes to provide maximum versatility. Green light is suitable for PSI and white light for VSI; thus, some illumination systems have included both sources (a green LED and a white light LED) and a mechanical switch in front of the instrument's optics to allow switching between the two, as illustrated schematically in FIG. 1. A drawback of this configuration has been the fact that the moving part necessarily introduces vibrations in the system that are highly undesirable for interferometric measurements.

Figure 2:
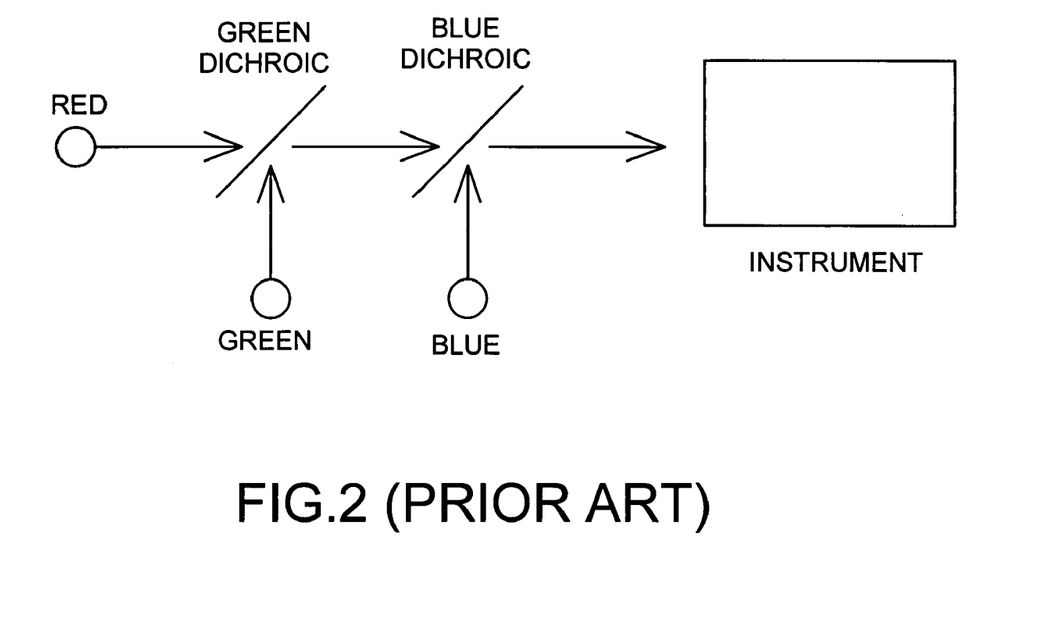
FIG. 2 illustrates a system wherein red, green and blue LEDs are combined with two dichroic mirrors to provide white light or a selected narrowband light.
Figure 3:
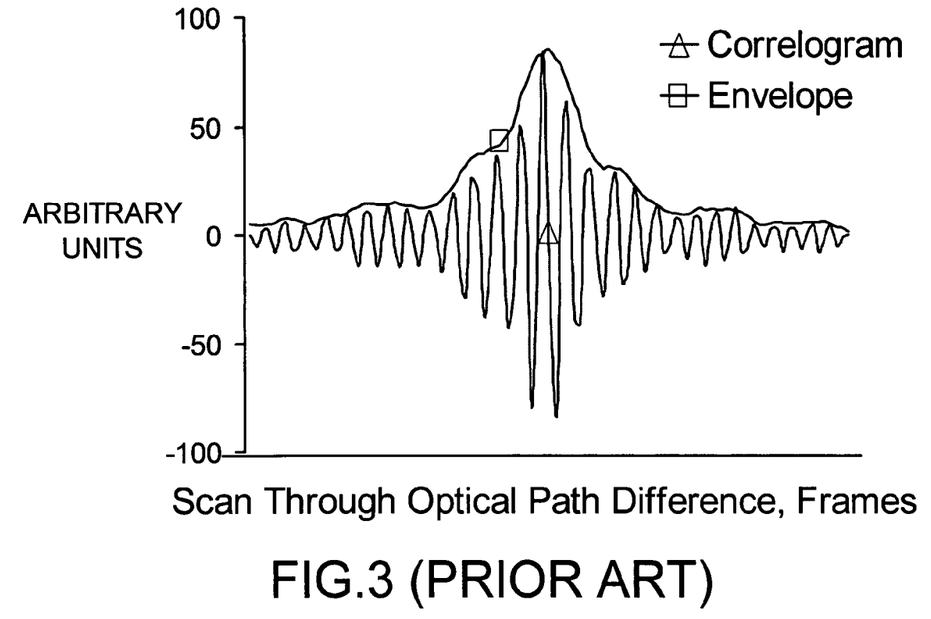
FIG. 3 illustrates the kind of correlogram and modulation envelope associated with white light produced by the system of FIG. 2 and the "ringing" problem associated with it.

Another approach has been to combine red, green and blue LEDs with two dichroic mirrors operating in reflection, as illustrated schematically in FIG. 2. As is readily understood by one skilled in the art, when all three LEDs are energized, the output of the illumination system is white light. Otherwise, a particular single wavelength may be selected simply by turning off the undesired ones. This configuration eliminates the shutter, thus allowing switching among a variety of wavelengths without mechanical action and attendant vibrations. However, the drawback of the system is the fact that the intensity spectrum of the white light produced by combining red, green and blue, while apparently white, is not sufficiently Gaussian to constitute true white light and is therefore not suitable for interferometry. As those skilled in the art would readily recognize, the correlograms and modulation envelopes produced by interferometric measurements are wide and exhibit so-called "ringing," as illustrated in FIG. 3. Moreover, this system is relatively expensive due to the large number of components (three LEDs and two dichroic elements).

Figure 4:
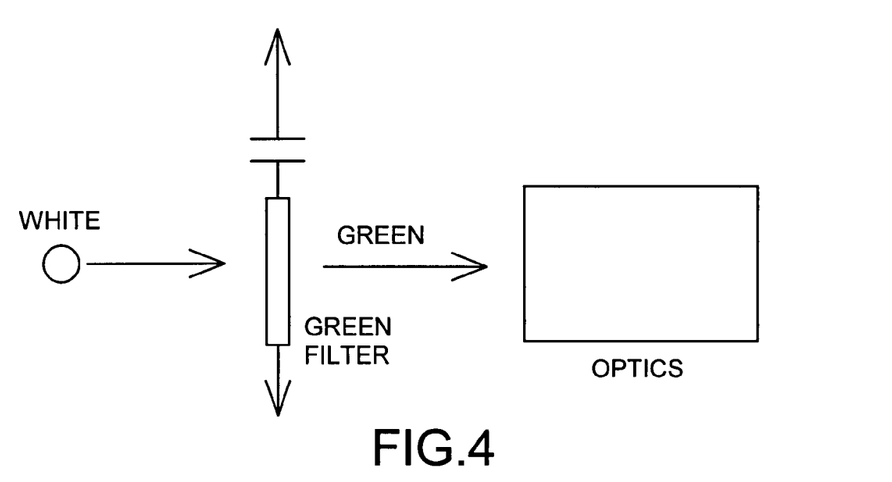
FIG. 4 shows an illumination system including a single white-light source and a movable green filter.

The number of components in the illumination system could seemingly be reduced significantly simply by using a single white-light source and a movable green filter operating in transmission, as illustrated schematically in FIG. 4. The problem with this solution, however, lies in the fact that it still includes a movable part, the filter, and further that green filters tend to attenuate the incoming white light beyond a useful level of intensity in the output green band. Therefore, this apparently simple solution is not practical and a new illumination system with fewer elements and no mechanical components would be very desirable. The present invention addresses this remaining need.

BRIEF SUMMARY OF THE INVENTION

Figure 5:
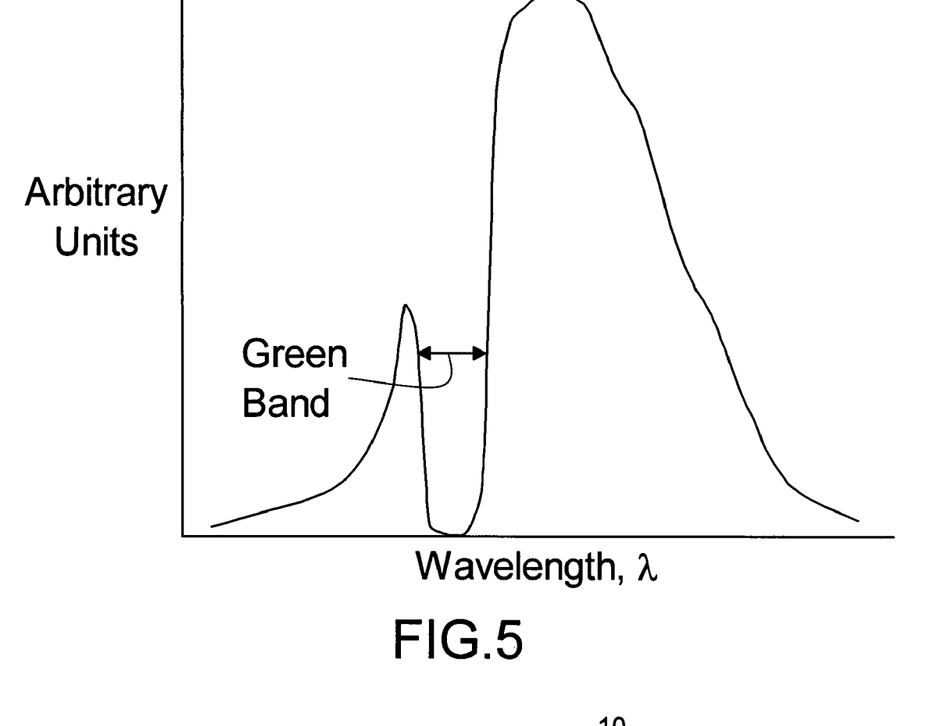
FIG. 5 illustrates the typical narrowband gap in the intensity spectrum at the output of a reflective dichroic filter illuminated with white light.

It is known that dichroic filters (also referred to in the art as Rugate mirrors or filters) can be used to remove a particular wavelength band from an incoming light beam. For example, green light may be filtered out of white light, as illustrated in FIG. 5, to produce a spectrum wherein the spectral band corresponding substantially to green light is missing. Thus, the illumination system of the invention combines a white-light source and at least one narrowband source of interest (green, for example) with a dichroic element operating in reflection for filtering out the green band from incident white light and for reflecting on axis the green light received from a separate source. Thus, when the green source alone is energized, the output of the illumination system is green only and its intensity is appropriately tuned by varying the power to the green source. When a white-light output is desired, both sources are energized and, according to one aspect of the invention, the intensity of the green light is judiciously calibrated to match the spectrum filtered out by the dichroic mirror. Therefore, the system can switch between green and white light simply by changing the selection of energized sources, without any mechanical switching and attendant delays and vibrations.

According to another aspect of the invention, the matching of the output of the narrowband source with the spectral band removed by the dichroic filter (i.e., the process of calibrating the narrow-band source to produce a true white-light output from the illumination system) is carried out by varying the ratio of the power energizing the narrowband source and the white-light source so as to produce as nearly a Gaussian output as possible. The system is calibrated to find the power ratio that produces the best Gaussian fit in the spectral output and the resulting power setting is used to produce white light for measurement purposes.

Using the same principle, multiple narrowband sources (such as green and blue LEDs) may be combined with respective dichroic mirrors and a white-light source to provide additional illumination options without moving parts. In each case, the band gap produced by each dichroic mirror is filled by the corresponding narrowband source calibrated to best fit an overall Gaussian output.

Various other advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly-pointed out in the claims. However, such drawings and description disclose but a few of the various ways in which the invention may be practiced.

DETAILED DESCRIPTION OF THE INVENTION

The heart of the invention lies in the recognition that a narrowband light source and a corresponding narrowband dichroic filter operating in reflection may be used advantageously in combination with a white-light source to produce either type of light if the ratio of power of the sources if appropriately calibrated to approximate a natural white-light output when both sources are energized. The same concept may be extended to selectively produce white light or any combination of a plurality of narrowband lights without any mechanical shutter or other mechanical component, thereby avoiding the time delay in data acquisition and the undesirable vibrations associated with mechanical parts.

As used herein, the term "reflective stop-band filter" is intended to refer to an optical element that transmits all light incident upon it except for a band (or bands) of interest, which is stopped by reflection (as opposed to absorption). For example, a reflective green filter is intended to refer to an optical element that, upon receiving a beam of white light, would substantially reflect the green band and transmit the balance of white light incident upon it. Dichroic filters that operate on reflection are typically used in the art for this purpose. Accordingly, the invention is described in terms of dichroic elements, but it is not intended to be so limited. Furthermore, to the extent that the precise meaning of "dichroic" implies splitting an incident beam into only two bands, the term is not intended to be so restrictive in meaning for the purpose of this invention. Rather, "reflective dichroic" is intended to refer to any filter that separates an incoming beam into two or more separate bands by stopping one or more bands on reflection.

Figure 6:
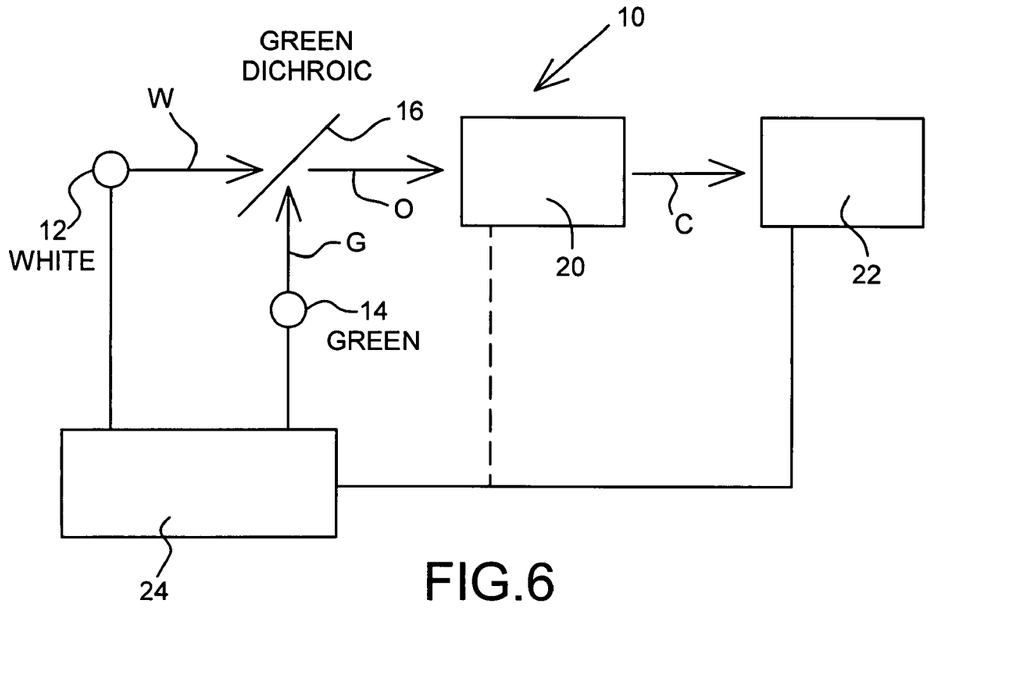
FIG. 6 illustrates the most basic configuration of the invention, including a reflective dichroic mirror combined with a white-light source and a narrowband source.

Referring to FIG. 6, the most basic configuration of the invention is illustrated schematically. An illumination system 10 comprises a white light source 12 (preferably an LED), a green light source 14 (also an LED), and a dichroic filter 16 adapted to reflect the incident green light G on axis with the portion of white light W transmitted along the optical axis of the system. The combined light output O produced by the illumination system 10 is then directed toward a conventional interferometer 20 (illustrated in generic configuration in the figure) to produce correlograms C detected by a camera 22 in order to carry out surface measurements in conventional fashion. Each light source 12,14 may be energized independently and tuned as desired to produce the required intensity for a particular application. To that end, a control unit 24 with switches and circuitry adapted to energize the light sources 12 and 14 independently and with varying levels of power is coupled to the illumination system 10 of the invention. The control unit 24 may also include a processor and be connected to the camera 22 (as illustrated) or to the computer operating the interferometer 20 in order to acquire interferometric data and provide automated control of the power sources 12,14.

Figure 7:
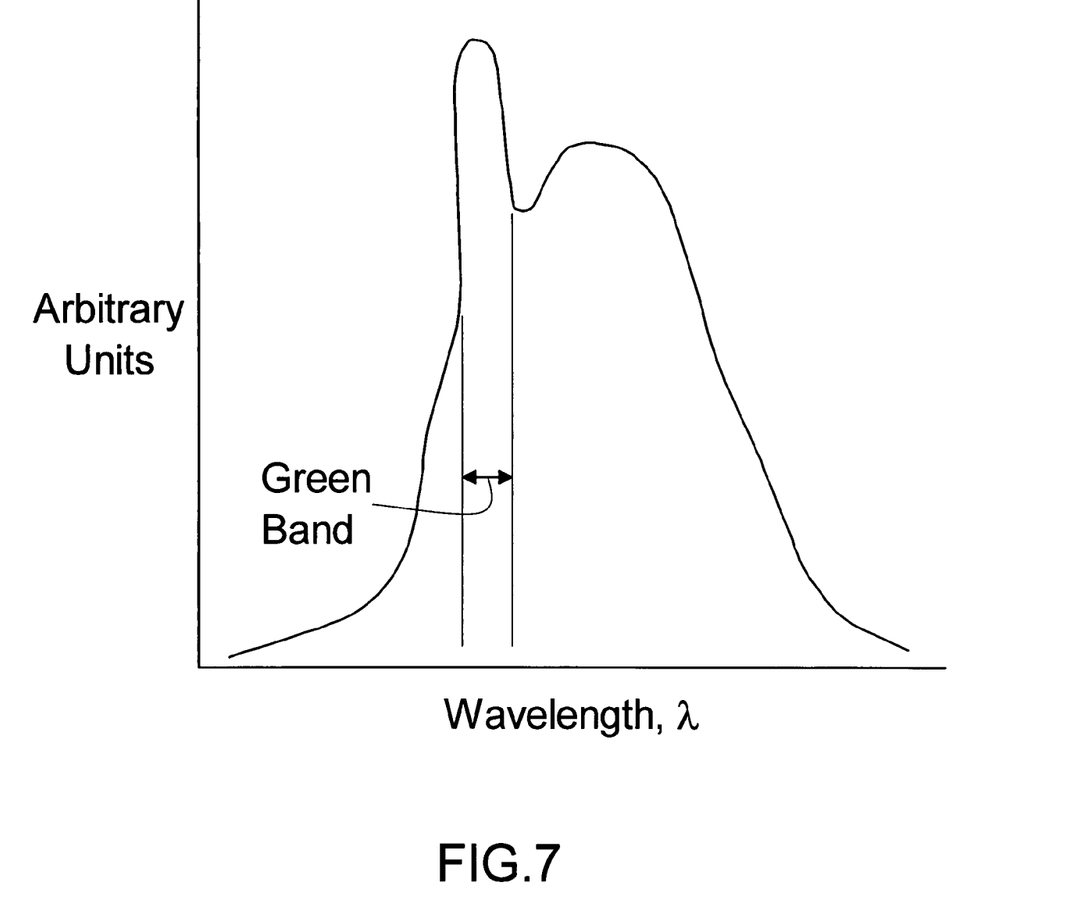
FIG. 7 shows the spectral distribution produced by the uncalibrated combination of white light with a narrowband light source in the illumination system of FIG. 6.

Unfortunately, white light is attenuated to a significant degree by dichroic filters. Thus, even if the white-light source 12 is energized at maximum practical power, if the narrowband source 14 is simply energized to the degree required for PSI measurements, the composite spectrum will not correspond to true white light. As shown in FIG. 7, the spectrum produced by the uncalibrated system reflects this relative attenuation and is not a true representation of white light. As a result, the modulation envelopes produced by the system 10 would exhibit "ringing" that affects the accuracy of VSI measurements.

We found that the power of the narrowband source 14 and that of the white light source 12 can be judiciously calibrated to approximate true white light. In order to compensate for the change in reflectivity of different samples and for the different amounts of light collected by different objectives, the total intensity is adjusted but the intensity ratio between the two sources 12,14 is kept the same. Accordingly, an effective way to calibrate the illumination system is to produce a series of correlograms and corresponding modulation envelopes at increasing narrowband-to-white power ratios and to find the ratio that produces an envelope that best fits a Gaussian curve according to some merit function. For example, the integral of the difference between the actual modulation envelope and a corresponding Gaussian curve is calculated over the coherence length for different power ratios and the ratio corresponding to the minimum residual between the modulation envelope and the corresponding Gaussian curve is used for white-light measurements.

Figure 8:
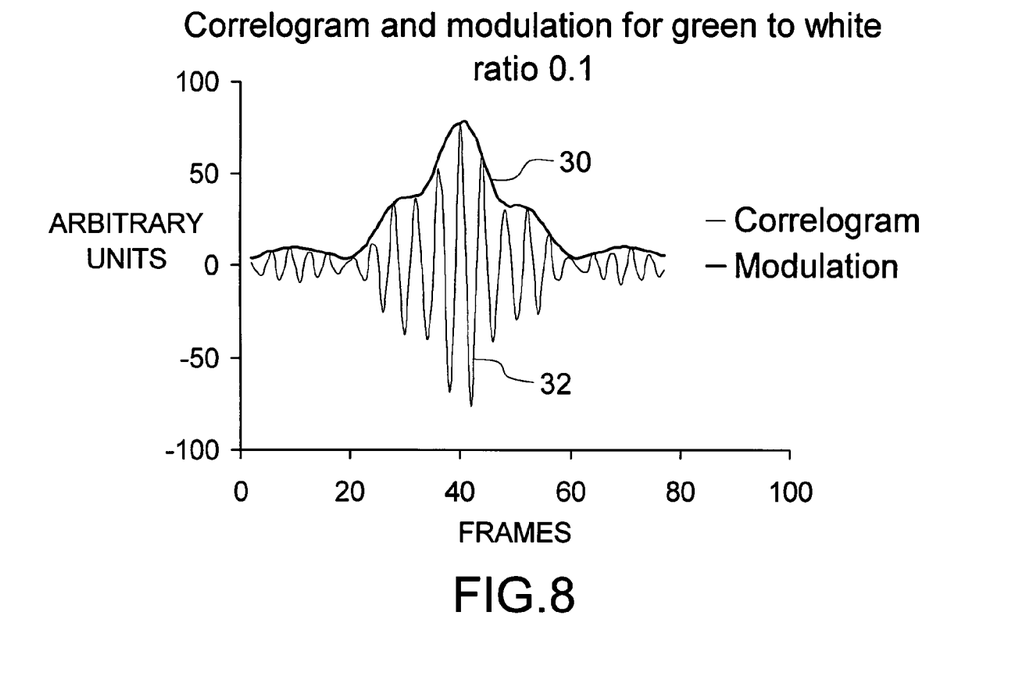
FIG. 8 is an illustration of the modulation envelope corresponding to a correlogram produced with a green-to-white power ratio of 0.1 in an illumination system including a white LED, a green LED, and a reflective dichroic filter in the configuration of FIG. 7.
Figure 9:
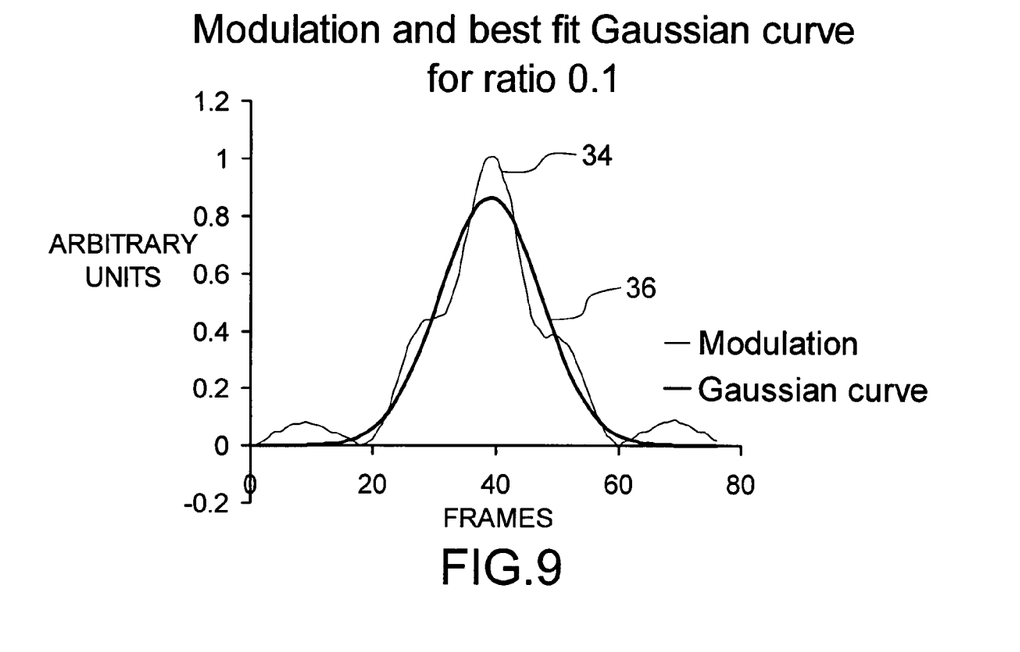
FIG. 9 shows a normalized envelope of the data of FIG. 8 superimposed over a Gaussian curve.
Figure 10:
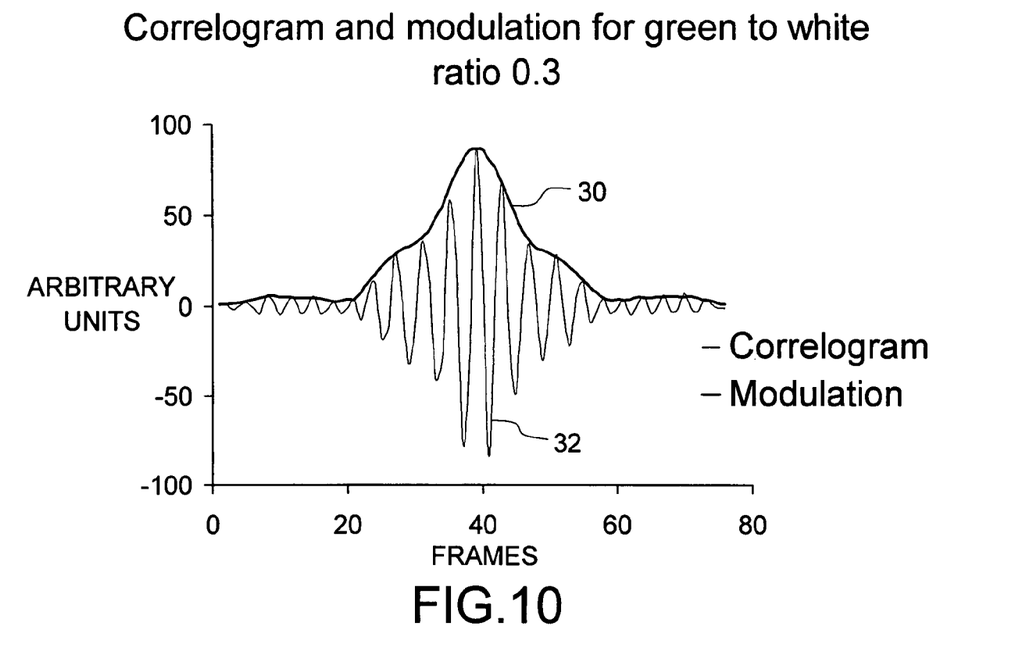
FIG. 10 is the modulation envelope corresponding to a correlogram produced with a green-to-white power ratio of 0.3 with the illumination system of FIG. 7.
Figure 11:
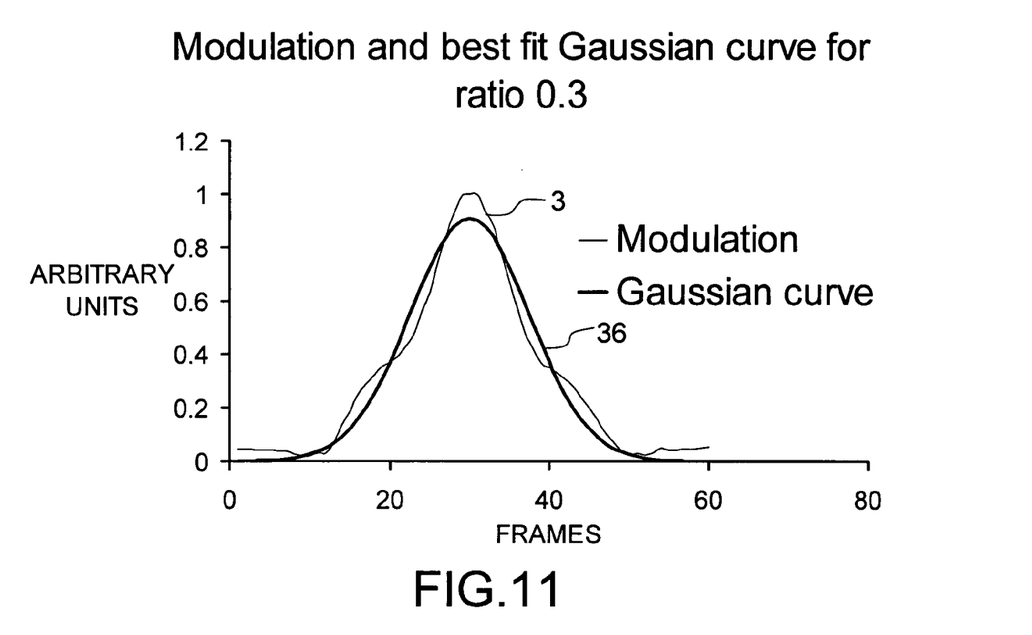
FIG. 11 shows a normalized envelope for the data of FIG. 10 superimposed over a Gaussian curve.
Figure 12:
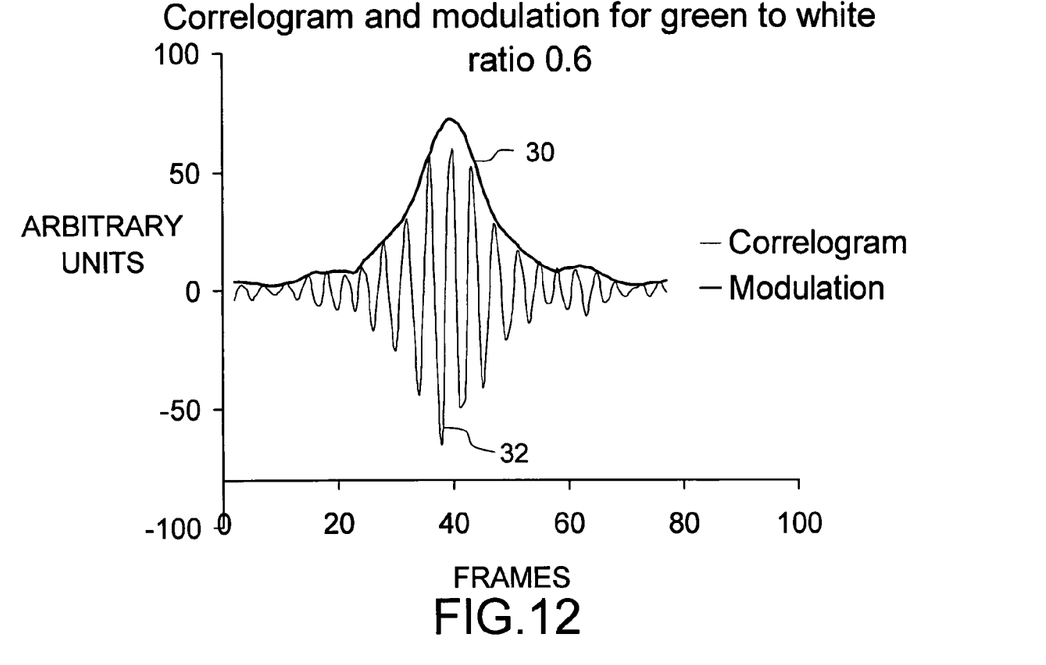
FIG. 12 is the modulation envelope corresponding to a correlogram produced with a green-to-white power ratio of 0.6 with the illumination system of FIG. 7.
Figure 13:
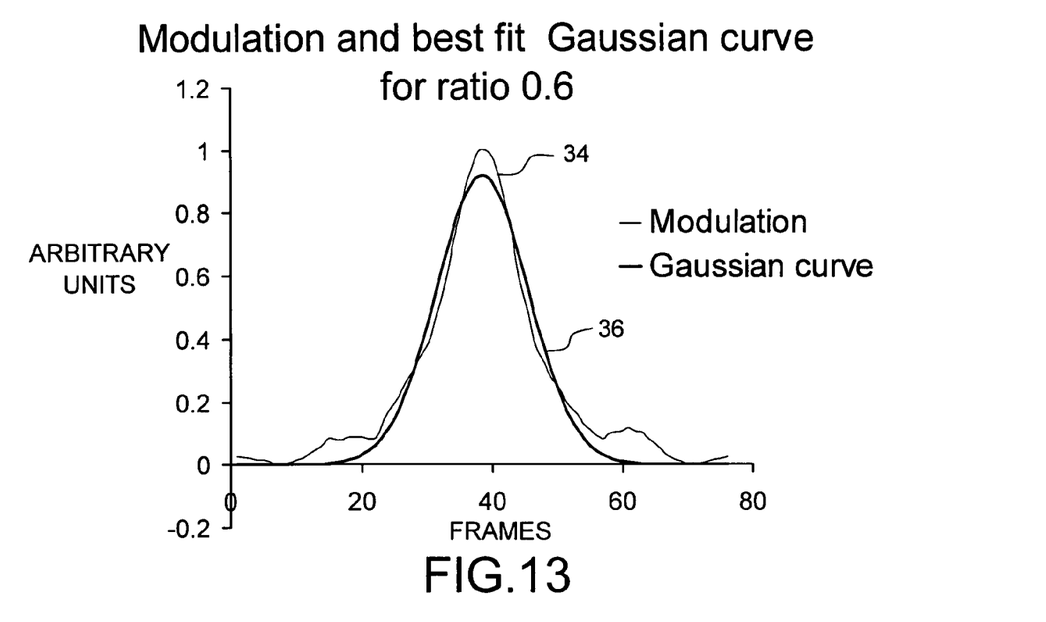
FIG. 13 shows a normalized envelope for the data of FIG. 12 superimposed over a Gaussian curve.
Figure 14:
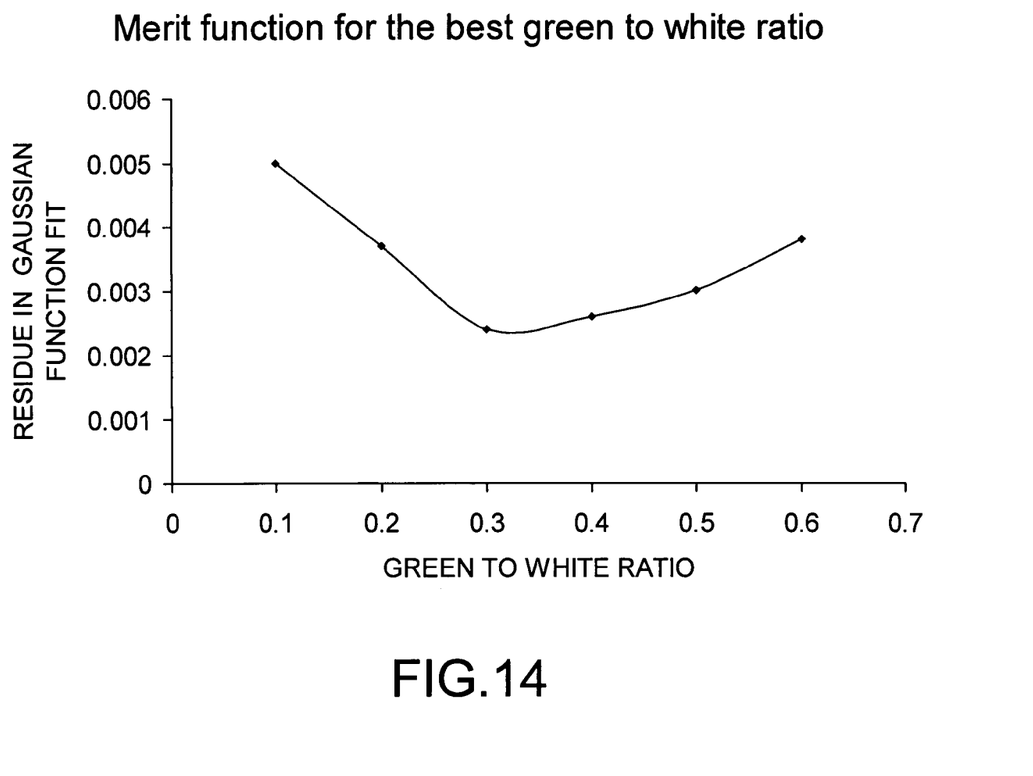
FIG. 14 illustrates a merit function derived for green-to-white power ratios varying between 0.1 and 0.6 for the system used to generate the data illustrated in FIG. 8-13, showing that the best Gaussian fit is found at a power ratio of approximately 0.3.

FIGS. 8-13 illustrate the mechanics of this approach. FIG. 8 is the modulation envelope 30 corresponding to a correlogram 32 produced by a green-to-white power ratio of 0.1 in a system using a white LED, a green LED, and a dichroic filter in the configuration of FIG. 7. FIG. 9 shows a normalized envelope 34 for the data of FIG. 8 and a corresponding Gaussian curve 36 superimposed over it. The integral of the absolute value of the difference between the two curves is used as the merit function and minimized as a function of power ratio. FIGS. 10-13 illustrate the same quantities for ratios of 0.3 and 0.6, and FIG. 14 shows the merit function for power ratios varying between 0.1 and 0.6. For this system, it is clear that the best Gaussian fit is found at a power ratio of approximately 0.3. Therefore, the instrument would be calibrated by setting the power of the light sources at this level.

Figure 15:
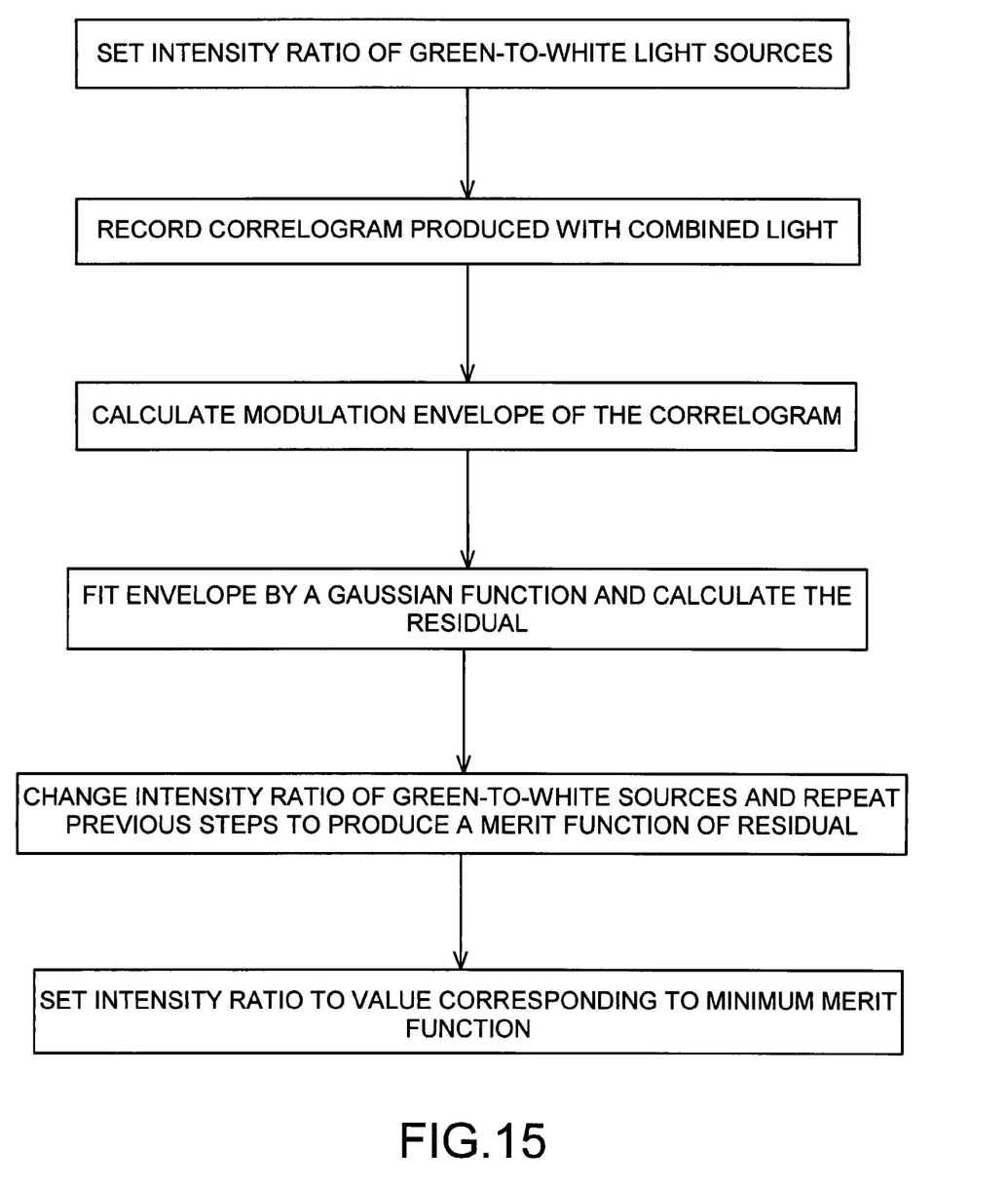
FIG. 15 is a block diagram of the basic calibration process of the invention.

We found that power drifts resulting from temperature variations and time for a system in this configuration are normally minimal; therefore, a pre-calibrated system can be used without further tuning for subsequent routine measurements. If a particularly sensitive measurement is required, an automated calibration routine may be incorporated into the system based on the same principles, so that the power ratio may be adjusted as needed for any particular application. FIG. 15 is a flow chart of the calibration process.

Thus, a procedure has been identified that permits the selective delivery of narrowband or white light in an illumination system for interferometric purposes without mechanical components. The system affords the advantages of fast switching between wavelength bands without vibration or time delay.

Figure 16:
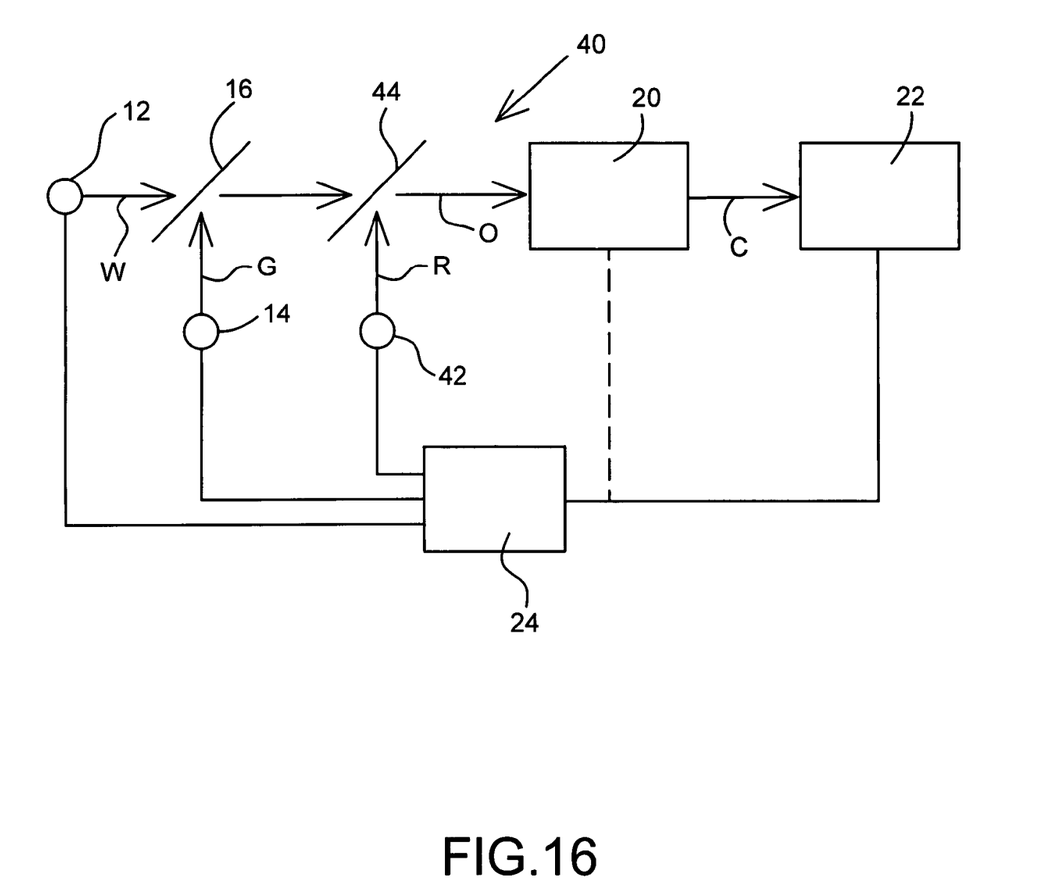
FIG. 16 is an alternative embodiment of the invention wherein two narrowband sources are combined with two reflective dichroic filters and a white-light source to provide a three-color illumination selection.

While the invention has been shown and described herein in what is believed to be the most practical and preferred embodiments, it is recognized that departures can be made therefrom within the scope of the invention. For example, the invention has been described in terms of a two-color illumination system (white and green), but it is clear that the same approach could be used to provide a three-color option, as illustrated in FIG. 16, or even more colors. In this alternative embodiment 40 of the invention, an additional light source 42, such as a red LED, may added with a corresponding reflective red dichroic filter 44 in the optical train of the illumination system to provide the option of red light illumination R. For white-light illumination, the power ratio of the red-to-white sources is calibrated in the same manner described above with reference to the green source, but the power ratio of the red light to the light received from the green filter (or vice versa) is used for calibration.

In addition, the invention has been described in terms of LEDs and dichroic filters, but it is clear that any suitable light source and any filtering element capable of stopping in reflection one or more predetermined narrow bands from incident white light (and therefore also capable of reflecting the same narrow bands incident from another source) on-axis with the transmitted portion of white light would be suitable to practice the invention. Similarly, the calibration process has been described in terms of a power ratio of narrowband-to-white light powers, but the reverse ratio would serve equally well.

Finally, the exemplary calibration procedure has been described in terms of the modulation envelope produced by an interferometer coupled to the illumination system of the invention because that is its primary intended application, but one skilled in the art would readily recognize that the system could be used advantageously for other applications. In such cases, as well as for interferometric applications, the calibration of the power ratio could be carried out in equivalent manner by finding the best fit of the spectral output of the illumination system, rather than the modulation envelope of a correlogram, to a Gaussian curve. Since the spectral distribution of white light is also Gaussian, using the spectrum of the output light would give the same result.

Therefore, the invention is not to be limited to the details disclosed herein but is to be accorded the full scope of the claims so as to embrace any and all equivalent processes and products.

The invention claimed is:

1. An illumination system for selectively producing a light output of variable wavelength, comprising:
    a first light source of a first spectral band;
    a second light source of a second spectral band, said second spectral band being narrower than and contained within said first spectral band;
    a reflective stop-band filter for producing a transmitted beam by filtering said second spectral band substantially out of a first light beam received from said first light source, and for reflecting a second light beam received from said second light source on axis with said transmitted beam; and
    control means for selectively energizing either or both of said first and second light sources.

2. The system of claim 1, further including a calibration unit for varying a power ratio between a power emitted by said second light source and a power emitted by said first light source.

3. The system of claim 2, wherein said calibration unit includes a means for comparing to a Gaussian curve a spectral distribution of an output of the illumination system when both light sources are energized, and a means for optimizing said power ratio so as to produce a best Gaussian fit.

4. The system of claim 3, wherein said means for optimizing said power ratio so as to produce a best Gaussian fit includes means for minimizing as a function of the power ratio a merit function based on an integral of a difference between said spectral distribution and said Gaussian curve.

5. The system of claim 1, further including an interferometer adapted to receive said output of variable wavelength from the illumination system.

6. The system of claim 5, wherein said calibration unit includes a means for comparing to a Gaussian curve a spectral distribution of an output of the illumination system when both light sources are energized, and a means for optimizing said power ratio so as to produce a best Gaussian fit.

7. The system of claim 6, wherein said means for optimizing said power ratio so as to produce a best Gaussian fit includes means for minimizing as a function of the power ratio a merit function based on an integral of a difference between said spectral distribution and said Gaussian curve.

8. The system of claim 1, wherein said first spectral band is white light, said second spectral band is green light, and said reflective stop-band filter is a reflective green dichroic filter.

9. The system of claim 1, further including:
    a third light source of a third spectral band, said third spectral band being narrower than and contained within said first spectral band;
    a second reflective stop-band filter for producing a second transmitted beam by filtering said third spectral band substantially out of said transmitted beam received from said first reflective stop-band filter, and for reflecting a third light beam received from said third light source on axis with said second transmitted beam; and
    control means for further selectively energizing either one of or all of said first, second and third light sources.

10. The system of claim 9, wherein said first spectral band is white light, said second spectral band is green light, said third spectral band is red, said reflective stop-band filter is a reflective green dichroic filter, and said second reflective stop-band filter is a reflective red dichroic filter.

11. The system of claim 10, further including a calibration unit for varying a power ratio between a power emitted by the second light source and a power emitted by the first light source, and further for varying a second power ratio between a power emitted by the third light source and a power received from the reflective stop-band filter.

12. A method for selectively producing a light output of variable wavelength, comprising the steps of:
providing a first light source of a first spectral band;
providing a second light source of a second spectral band, said second spectral band being narrower than and contained within said first spectral band;
providing a reflective stop-band filter for producing a transmitted beam by filtering said second spectral band substantially out of a first light beam received from said first light source, and for reflecting a second light beam received from said second light source on axis with said transmitted beam; and
selectively energizing either said first and second light sources together or said second light source alone in order to correspondingly produce an output of substantially said first spectral band or of said second spectral band alone, respectively.

13. The method of claim 12, further including the step of calibrating a power ratio between a power emitted by said second light source and a power emitted by said first light source.

14. The method of claim 13, wherein said calibration step is carried out by comparing to a Gaussian curve a spectral distribution of an output of the illumination system when both light sources are energized, and further by optimizing said power ratio so as to produce a best Gaussian fit.

15. The method of claim 14, wherein said optimizing so as to produce a best Gaussian fit includes minimizing as a function of the power ratio a merit function based on an integral of a difference between said spectral distribution and said Gaussian curve.

16. The method of claim 13, wherein said first spectral band is white light, said second spectral band is green light, said reflective stop-band-filter is a reflective green dichroic filter, and said light output of the system is coupled to an interferometer.

17. The method of claim 16, wherein said calibration step is carried out by comparing to a Gaussian curve a spectral distribution of an output of the illumination system when both light sources are energized, and further by optimizing said power ratio so as to produce a best Gaussian fit.

18. The method of claim 17, wherein said optimizing so as to produce a best Gaussian fit includes minimizing as a function of the power ratio a merit function based on an integral of a difference between said spectral distribution and said Gaussian curve.

19. The method of claim 16, further including the steps of:
providing a third light source of red spectral band;
providing a reflective red dichroic filter for producing a second transmitted beam by filtering said red spectral band substantially out of said transmitted beam received from said reflective green filter, and for reflecting a red light beam received from said third light source on axis with said second transmitted beam; and
wherein said step of selectively energizing is carried out by energizing either said first, second and third light sources together, or said second light source alone, or said third light source alone to correspondingly produce an output of substantially white light, or of green light, or of red light, respectively.

20. The method of claim 19, further including the step of calibrating a power ratio between a power emitted by said third light source and a power received from said green filter.

* * * * *